United States Patent [19]

Rosenkranz

[11] Patent Number: 5,142,553
[45] Date of Patent: Aug. 25, 1992

[54] RECEIVER WITH DIRECT QUADRATURE SAMPLING OF THE INPUT SIGNAL

[75] Inventor: Werner Rosenkranz, Erlangen, Fed. Rep. of Germany

[73] Assignee: U.S. Philips Corp., New York, N.Y.

[21] Appl. No.: 613,346

[22] Filed: Nov. 13, 1990

[30] Foreign Application Priority Data

Nov. 16, 1989 [DE] Fed. Rep. of Germany ....... 3938126

[51] Int. Cl.$^5$ ............................................. H04L 27/06
[52] U.S. Cl. ...................................... 375/75; 329/304
[58] Field of Search ................ 375/75, 80, 82, 94, 375/95, 23, 102; 329/300, 304

[56] References Cited

U.S. PATENT DOCUMENTS

| | | | |
|---|---|---|---|
| 4,606,050 | 8/1986 | Sekigawa et al. | 375/75 |
| 4,733,403 | 3/1988 | Simone | 375/75 |
| 4,779,054 | 10/1988 | Monteleone et al. | 375/94 |
| 4,910,752 | 3/1990 | Yester, Jr. et al. | 375/94 |
| 4,955,039 | 9/1990 | Rother et al. | 375/75 |

*Primary Examiner*—Stephen Chin
*Attorney, Agent, or Firm*—Jack D. Slobod

[57] ABSTRACT

In a receiver, normal and quadrature components of a signal modulated on a carrier signal (at a second IF frequency) are directly obtained by carrier signal sampling with an analog-to-digital converter (A/D) at sampling instants controlled by periodically recurrent sampling pulses spaced apart by an odd multiple of a quarter period of the carrier signal. In order to create enhanced selection options at selectable carrier frequencies, an odd first number of equidistant sampling instants are combined into a group and a group distance between the last sampling instant of a group and the first sampling instant of the next group is a second integer (different from the second integer) multiple of the quarter period of the carrier. The signal samples at odd and even positioned sampling instants within a group are respectively directed to two different signal branches; the two branches are respectively for determining samples of the normal and quadrature components. The samples at even positioned sampling instants are delayed and the samples at odd positioned sampling instants are interpolated to produce simultaneous pairs of samples in the two signal branches, which are applied to mean determining filters.

11 Claims, 5 Drawing Sheets

RECEIVER WITH DIRECT QUADRATURE SAMPLING OF THE INPUT SIGNAL

BACKGROUND OF THE INVENTION

1. Field of the Invention

The invention relates to a receiver in which a normal component and a quadrature component of a signal that is modulated on a carrier signal are directly generated by sampling the carrier signal, the sampling instant being determined by a sequence of sampling instants.

2. Description of the Related Art

In the article entitled "Quadrature Sampling of FM-Bandpass Signals—Implementation and Error Analysis", W. Rosenkranz, Proc. of the Int. Conf. on Digital Signal Processing, Florence, Italy, 1987, pp. 377 to 381, the sampling is described of frequency-modulated bandpass signals in which the real and imaginary parts of the complex envelope, the so-called quadrature components, are directly produced by sampling the modulated bandpass signals at a carrier frequency $f_c$. For this purpose, an analog-to-digital converter is controlled by means of periodically recurrent sampling pulses having a frequency $f_Q$, to be denoted as clock frequency $f_Q$ hereinafter.

The clock frequency $f_q$ is to be selected in such a way that a sampling interval $T_a$ for sampling the normal component, i.e. the real part of the bandpass signal, exactly corresponds to a half period of the carrier frequency or an integer multiple of this time interval respectively. With odd multiples, however, the sign of each second sample value can be inverted. In order to produce sample values of the quadrature component which is in quadrature to the sample values of the normal component thus produced, the input signal is to be sampled at instants which with respect to the sampling instants of the normal component present a time-delay of a quarter of the carrier signal period or a quarter plus an integer multiple of the half carrier signal period. Also in this case with odd multiples the sign of each second sample value has to be inverted. In this manner value pairs will be obtained corresponding to a sampling frequency of $f_a = 1/T_a$ which correspond to the real and imaginary parts of the complex envelope.

In a circuit arrangement described in the article mentioned hereinbefore only a single analog-to-digital converter is necessary. The clock frequency $f_Q$ is selected in such a way that the clock interval $T_q = 1/f_q$ is equal to a quarter of the period plus an integer multiple of the half period of the carrier frequency. Consequently, the two conditions mentioned hereinbefore are alternately fulfilled so that each sample Value alternately corresponds to the normal component and the quadrature component. By means of an interpolation filter the time-delay of I and Q components obtained in pairs is eliminated so that values corresponding to those of a simultaneous sampling of I and Q components are obtained at the output of the filter. Thus, the ratio of the carrier frequency $f_c$ to the half sampling frequency $f_a/2$ is an integer and cannot be chosen arbitrarily.

A further condition is that the sampling frequency $f_a$ is at least equal to the bandwidth B of the bandpass signal to be sampled.

With bandpass signals whose signal of which the content is derived from a sequence of binary values based on a bit clock frequency $f_b$, it is advantageous for the sampling frequency $f_a$ to be chosen to be equal to the bit clock frequency $f_b$.

In transmission systems in which, for example, this bit clock frequency $f_b$ is a predetermined value, the choice of the carrier frequency $f_c$ in priorart arrangements is thus considerably restricted by the described items.

SUMMARY OF THE INVENTION

It is an object of the invention to extend the selection possibility from the available carrier frequencies in a receiver of this type.

This object is achieved in that a plurality of equidistant sampling instants are combined into a group and in that for the distance in time between the last sampling instant of a group and the first sampling instant of the next group (group distance) an interval is selected different from the distance in time between two successive sampling instants within a group.

By means of the selectable group distance the length of a sampling interval $T_a$, corresponding to the distance between a first sampling instant of a group and the first sampling instant of the next group (group length), can be selected arbitrarily. This is advantageous in that the sampling interval and the carrier frequency can be adapted to each other by appropriately selecting the group distance. By means of equidistant sampling instants within the group of sampling instants the normal and quadrature components are further obtained in prior-art manner. By accordingly selecting the group distances, a phase rotation develops between corresponding sample values of successive groups. This phase rotation may be eliminated by means of a further processing of the sample values.

If the group distance is selected in such a way that it corresponds to a multiple of a quarter of the period of a carrier signal, said phase rotation will correspond to a multiple of 90°. This is advantageous in that the subsequent processing is reduced to an inversion of the sample values and, if necessary, to an interchanging of the sample values. Since inversions and interchanges can be performed in a relatively simple manner, the subsequent processing entails only little circuitry and cost in this embodiment.

By selecting individual group distances differing from one group to the next, even these interchanges and, if necessary, also the inversions can be omitted. In another application the mutually different group distances may produce sample values present each a different phase rotation. As will be further explained in an exemplary embodiment, the further processing of the received signals may thus be simplified.

BRIEF DESCRIPTION OF THE DRAWING

The invention will be further described and explained in the following with reference to the exemplary embodiments shown in the drawings, in which.

DETAILED DESCRIPTION OF THE PREFERRED EMBODIMENTS

Figure 1:
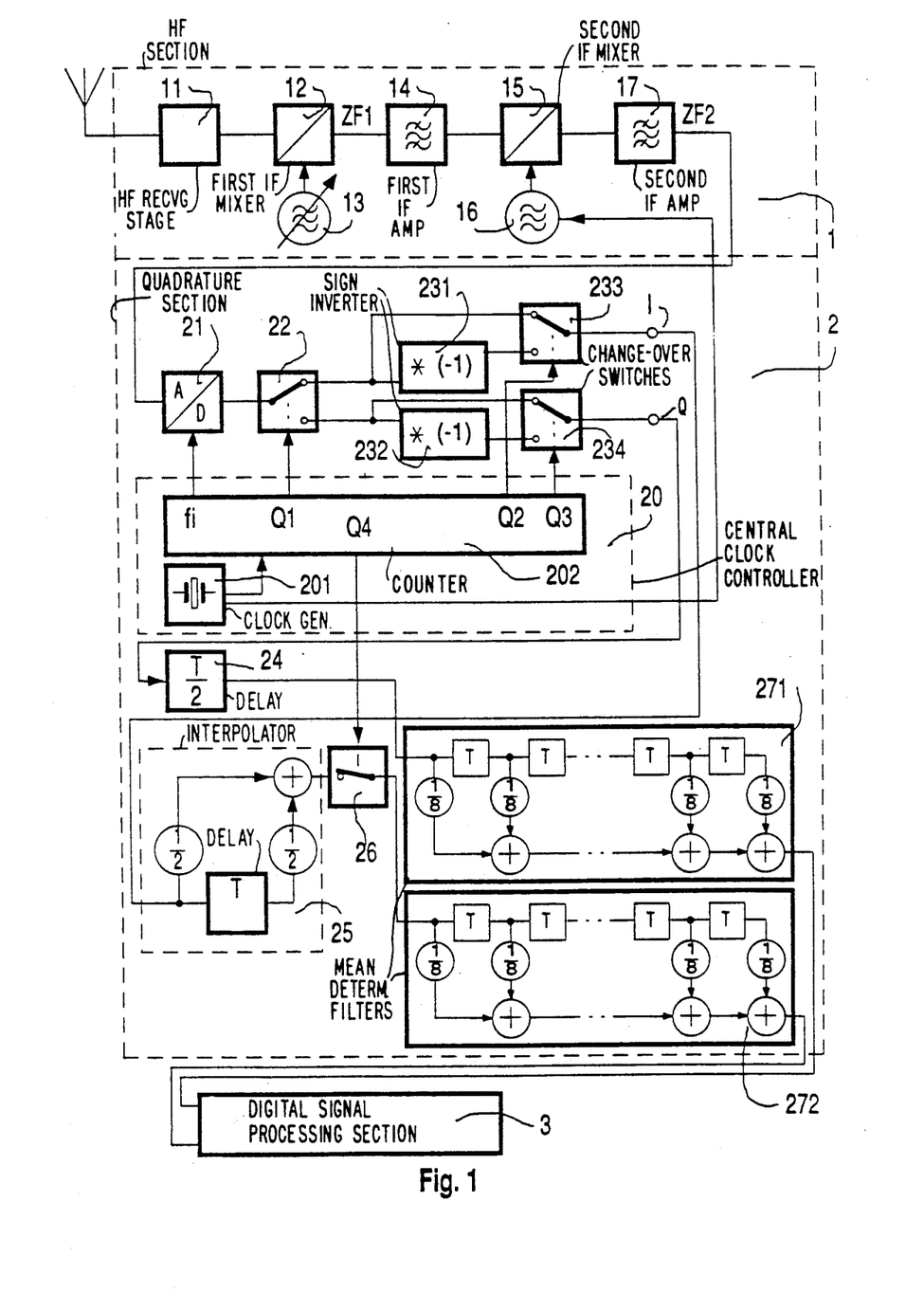
FIG. 1 shows a block diagram for a receiver having direct quadrature sampling.

In the following exemplary embodiments binary encoded signals are started from, based on a bit rate of $f_b = 270.833$ kHz ($= 13$ MHz/48) and modulated on a HF carrier by means of angle modulation. FIG. 1 shows in a diagram a radio receiver consisting of a HF section 1, a quadrature section 2 and an arrangement for digital signal processing 3.

In the HF section 1 the frequency of a received signal is selected and converted into a carrier frequency. For this purpose, the signal received from a HF receiving stage 11 is mixed down to a first intermediate frequency ZF1 by means of a first IF mixer 12 to which is applied a first variable IF mixing frequency $f_{zf1}$ by a first IF oscillator 13. The input signal mixed down to this first intermediate frequency is bandpass filtered in a first IF amplifier 14, amplified and applied to a second IF mixer 15, in which the input signal is mixed down to a second intermediate frequency ZF2 by means of a second intermediate frequency applied by a second IF oscillator 16. In a second IF amplifier 17 this second intermediate frequency ZF2 is again bandpass filtered and amplified.

The second intermediate frequency ZF2 is applied to an analog-to-digital converter 21 in the quadrature section 2. This analog-to-digital converter 21 is controlled by means of clock pulses $f_i$ generated by a central clock controller 20. In this exemplary embodiment the second intermediate frequency $f_{zf2}$ is selected in such a way that it corresponds to an integer multiple of the half bit clock frequency $f_b$. The value of 79 was selected as an integer ratio of second oscillator frequency $f_{zf1}$ to half bit clock $f_b$. This yields a second intermediate frequency of 10.6979166 MHz which is advantageous in that this intermediate frequency only slightly differs from the intermediate frequency of 10.7 MHz used in the radio range. This is advantageous in that commercially available filters can be inserted for this selected intermediate frequency $f_{zf2}$.

In a central clock controller 20 a clock generator 201 is arranged which generates a basic clock having a period which is a quarter of the periods of the second intermediate frequency $f_{zf2}$. Deviations from the provided frequency ratio of the second intermediate frequency ZF2 to the basic clock result in a frequency mistuning. Such frequency mistunings which are small with respect to the bandwidth of the signal can be tolerated with an appropriately arranged subsequent signal processing. However, it is more advantageous to eliminate such frequency mistunings in advance. It is especially advantageous to derive also the mixing frequency of the second IF oscillator 16 from the clock generator 201. This makes it possible to rigidly determine the frequency ratio of the second intermediate frequency ZF2 to the basic clock independent of external influences.

In this exemplary embodiment 158 basic clock signals correspond exactly to a bit clock having the bit frequency $f_b$. This basic clock signal is applied to a counter 202. This counter 202 generates the sampling pulse $f_i$ at each ninth basic clock signal. Consequently, two adjacent sample values are exactly $2\frac{1}{4}$ periods of the second intermediate frequency ZF2 apart. The counter generates a total of exactly seventeen of these equidistant successive sampling pulses within one bit clock. These seventeen successive sample values thus form a group of equidistant sample values. A sampling pulse which might occur at the 153rd basic clock is suppressed so that exactly nine sample values for the normal component and eight sample values for the quadrature component can be contained in each bit clock in this manner. After 158 basic clock signals the counter is reset and the clock generation for the sampling pulses $f_i$ is resumed as described hereinbefore. In this manner the sequence of the generated sampling pulses $f_i$ is periodically continued after each 158th basic clock signal.

Between the last sample value of a group of sample values and the first sample value of the next group of sample values there are exactly 14 basic clock signals. The groups thus follow each other 14 basic clock signals apart. In this exemplary embodiment the distance between the groups is chosen larger than the distance between two successive sample values within one group. However, the group distance can also be chosen to be smaller than the distance between two successive sample values within a group provided that a correspondingly fast analog-to-digital converter is used.

The technical implementation of counters is known to those skilled in the art of digital electronics. One of the possible embodiments of such a counter can be taken from Chapter 10.7 "Systematischer Entwirrung von Schaltwerken" of the title "Halbleiterschaltungstechnik", U. Tietze, Ch. Schenk, Springer Verlag Berlin, 8th edition, pp. 259 to 268. In the following the technical realisation of the counter 202 is hence not further explained. Instead, time-voltage diagrams for the individual switching signal outputs of the counter 202 are represented in separate Figures for a further description of the counter 202.

Figure 2A:
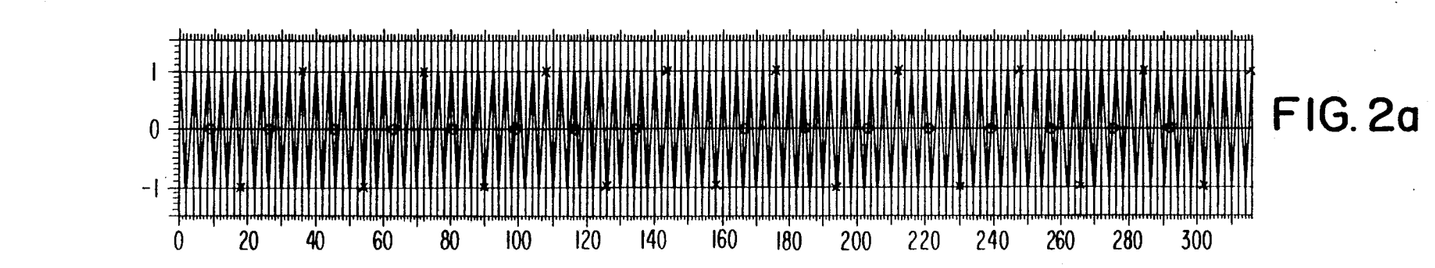
FIGS. 2A-2F show a sampling pulse sequence and various switching-signal time diagrams for 8-bit oversampling of an input signal in a bit interval of 158 basic clock signals and a periodic continuation of the sampling pulses after each bit interval.
Figure 2B:
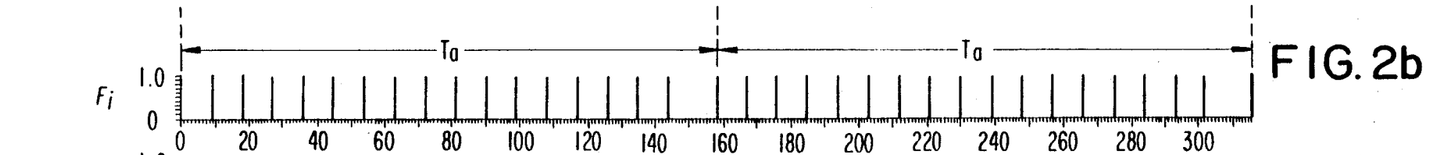
Figure 2C:
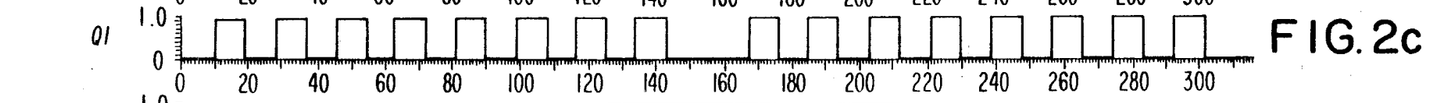

FIG. 2a represents an unmodulated carrier oscillation $f_c$, the bottom portion of FIG. 2a showing a time axis and each basic clock signal being represented by a line through the time axis. FIG. 2b represents the sampling pulses $f_i$ generated by the counter 202 and starting at the basic clock pulse 0. Clearly noticeable is the gap between the seventeenth sampling pulse accounting for the 144th basic clock pulse of the first bit clock and the next sampling pulse $f_i$ accounting for the first basic clock pulse of the next bit clock (=158th basic clock pulse). Since the distance in time between the sampling pulses $f_i$ is selected in such a way that this distance is exactly equal to $2\frac{1}{4}$ wavelengths of the second intermediate frequency ZF2 as described hereinbefore, these sampling pulses alternately cause sample values of the normal and of the quadrature components to occur. The alternately succeeding sample values of a bit clock period of the normal and the quadrature components are alternately allocated, by means of a component allocator 22, to a first signal branch for processing the normal component and to a second signal branch for processing the quadrature component by means of a component allocator 22 symbolically shown in the drawing as a change-over switch. An appropriate switching signal Q1 for controlling the component allocator 22 is also generated by the counter 202. The component allocator 22 is structured in such a way that the allocator applies the sample value present at an input to the first signal branch for processing the normal component when there is a low voltage level (low signal) at the switch input and applies the sample value present at the input to the second processing branch for processing the quadrature component when there is a high voltage level (high signal) at the switch input. The voltage variation of the switching signal Q1 that controls the component allocator 22 is represented in FIG. 2c. It is clearly noticeable that the switching signal Q1, starting at the 0th basic clock pulse, with a "low" signal alternately changes its voltage level from low to high and vice versa every ninth basic clock pulse. At the beginning of the next bit clock, in the exemplary embodiment and in FIG. 2a the basic clock pulse number 158, the signal variation of the switching signal Q1 corresponds to that in the previous bit clock.

Figures 2D, 2E, 2F:
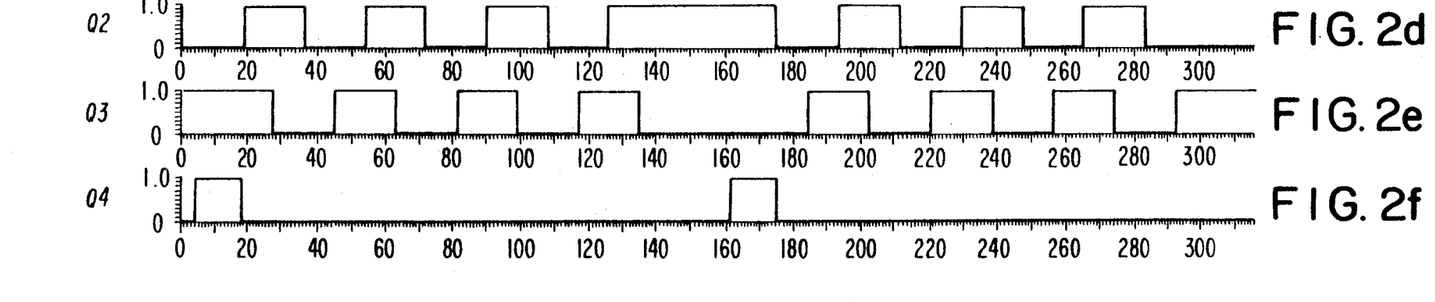
Figure 3A:
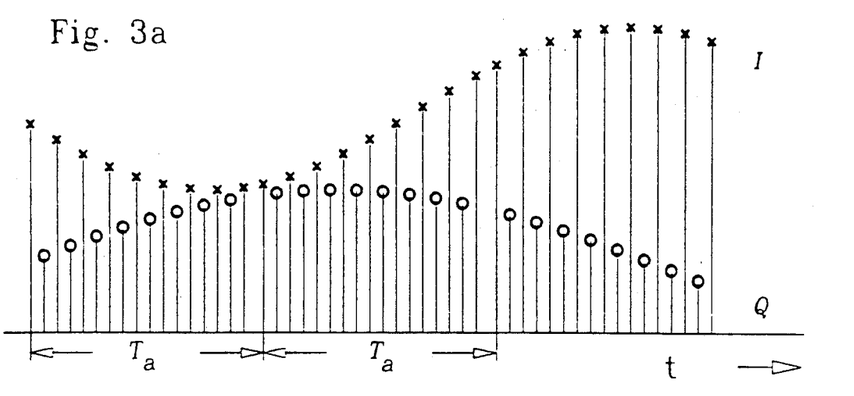
FIG. 3a shows sample values after sampling.

Since the distances between two sample values of the normal component and two sample values of the quadrature component thus correspond to odd multiples of the half period of the second intermediate frequency $f_{z/2}$, each second sample value of the normal component and each second sample value of the quadrature component is to be inverted. For this purpose, a sign inverter 231, 232 and a change-over switch 233, 234 are arranged in each signal branch. These change-over switches 233, 234 are structured in such a way that, if there is a "low" signal at their inputs, the sample values of the processing branch concerned are conveyed directly whereas, if there is a "high" signal at their inputs, the sample values are conveyed to the sign inverters 231, 232. The variation of a second switching signal Q2 that controls the first change-over switch 233 is shown in FIG. 2d and the loss of a third switching signal Q3 that controls the state of the second change-over switch 234, is represented in FIG. 2e. The second and third switching signals Q2, Q3 also produced by the counter 202 are selected in such a way that the sample value and the inverted sample value for each second sample value is alternately conveyed in each signal branch. FIG. 3a symbolically shows the sample values of a modulated signal obtained after the sign inversion, the normal components having an x at the top and the quadrature components an o at the top. Although normal and quadrature components are processed in separate signal branches, they are shown together in FIG. 3 so as to clarify their mutual allocation in time. From FIG. 3a it is evident that a sample value of the quadrature component controlled in time is always situated in the middle between two sample values of the normal component.

In an interpolator 25 the normal component is filtered. Since the sample values taken into account for the interpolation are equidistant and close together, the structure of the interpolator is thereby simplified and the interpolation result improved. In the exemplary embodiment a linear interpolator is used which forms an interpolation value from two succeeding sample values.

In the interpolator 25 each last sample value is buffered in a register. The buffered sample value and the sample value just present at the input are divided in two, for example, by shifting the bit pattern one position to the left, and then added together. The value interpolated in this fashion corresponds in a proper approximation to a sample value which would have been obtained midway between the two last sample values applied to the interpolator. In this fashion the interpolated sample value of the normal component and the sample value of the quadrature component sampled between the last two sample values of the normal component applied to the interpolator 25, can be considered to be sampled simultaneously.

Since the result of the interpolator 25 is always obtained only after the last two applied sample values have been processed, the associated sample value of the quadrature component is to be delayed in time by means of a delay element 24 in order to realise simultaneity between interpolated sample value and associated quadrature component during the further processing. This time delay corresponds exactly to the distance between two regularly succeeding sampling pulses $f_i$, that is to say, 9 basic clock signals in the exemplary embodiment. As a result of the interpolation eight interpolated sample values are formed from the nine sample values of the normal component of a bit clock signal (cf. FIG. 3b). A switch 26 controlled by a fourth switching signal Q4 prevents that an interpolated value formed after the ninth sample value is conveyed (cf. signal variation of the switching signal Q4 in FIG. 2e). Due to the delay of the interpolator output signals caused by the interpolation, the switching signal Q4 is generated delayed over exactly this delay period.

Figure 3B:
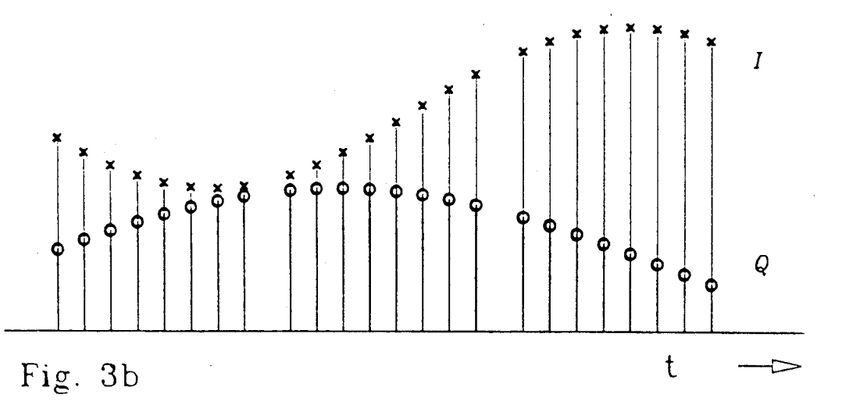
FIG. 3b shows sample values after interpolation.

FIG. 3b shows how eight interpolated sample values of the normal component are obtained from the nine sample values of the normal component.

The eight interpolated sample values of the normal component and the eight sample values of the quadrature component are applied each to its own mean determining filter 271, 272. In the filters 271, 272 a single value for the normal component or quadrature component respectively, is produced from the eight sample values. As a result of the 8-bit oversampling the quantization noise of the analog-to-digital converter is thus reduced by nine dB. In this manner exactly one value for the normal component and the quadrature component is obtained for each bit clock. Because of the equidistance of the eight sample values also the structure of the mean determining filter is simplified. In the exemplary embodiment the sample values of a bit clock signal multiplied by a factor of ⅛ are added together in order to obtain the mean value of each normal component and quadrature component of a bit clock.

Figure 3C:
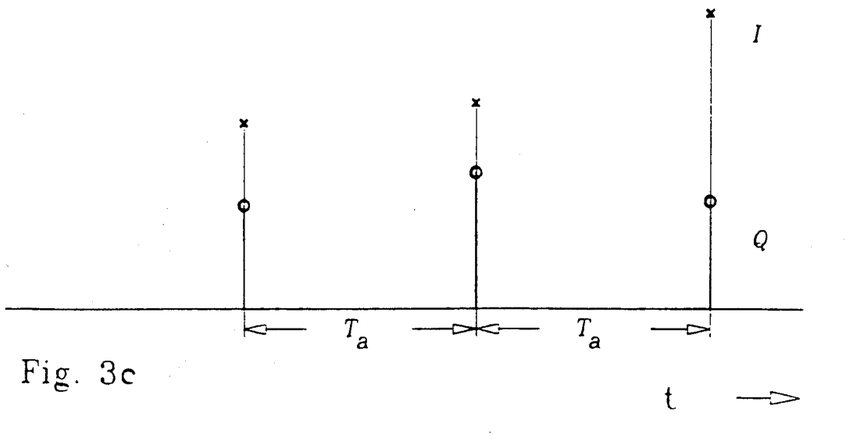
FIG. 3c shows sample values after taking the mean values.
Figure 4A:
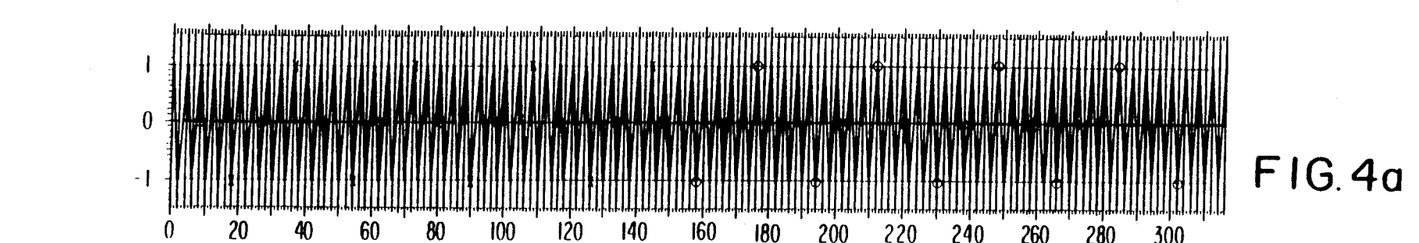
FIGS. 4A-4F show show sampling pulses and various switching-signal time diagrams for 8-bit oversampling of an input signal in a bit interval of 158 basic clock signals and a periodic continuation of the sampling pulses after 159 and 155 basis clock signals respectively.
Figure 4B:
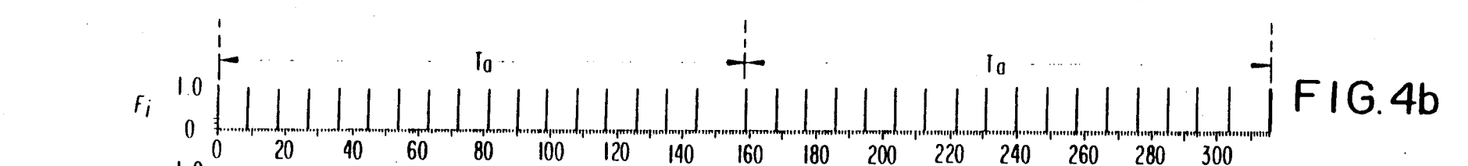
Figures 4C, 4D, 4E, 4F:
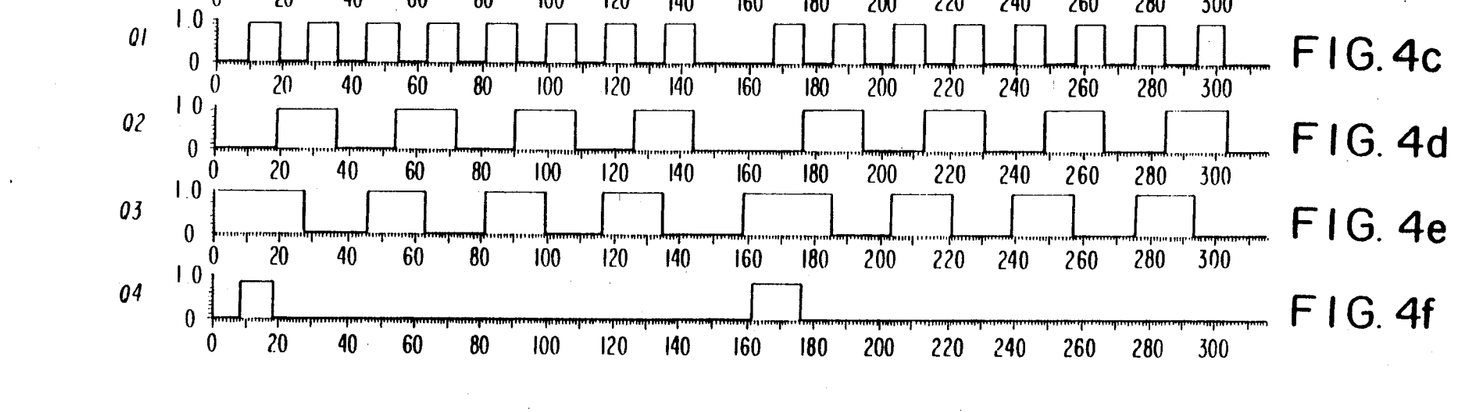
Figure 4C:
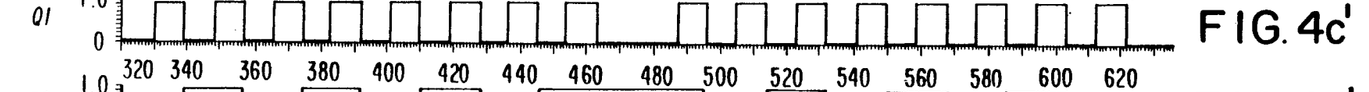
Figures 4D, 4E, 4F:
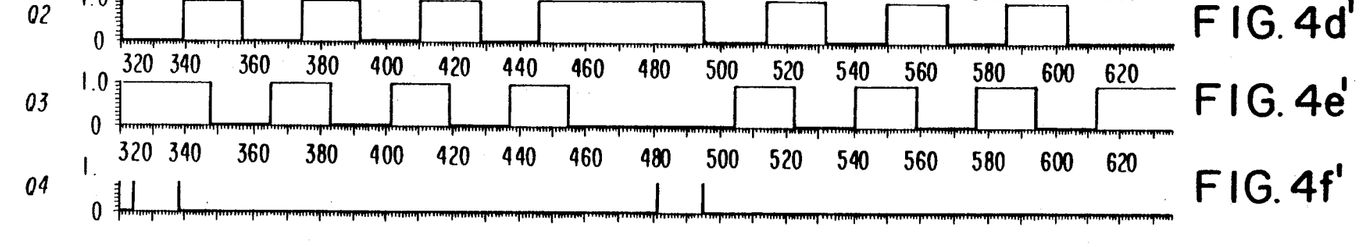

FIG. 3c shows how one mean sample value signal is produced from eight sample values at the end of a bit clock.

If the number of basic clock pulses accounting for one bit clock signal is a number dividable by four without a remainder, the sign of the result of taking the mean value of succeeding bit clock signals is correct and the quadrature components produced in above manner can be conveyed to the digital signal processing without being additionally processed. However, if there is a remainder of two per bit clock when the basic clock pulses are divided, as was the case hereinbefore, the quadrature components produced in above manner are to be inverted every second bit clock. However, this can be realised advantageously in that with each second bit clock signal the counter 202 generates the phase-shifted control signals for changing the states of switches 231, 232 through 180° (cf. more specifically, the variation of the switching signals Q2, Q3 during the basic clock pulses 158 to 159), so that in each second bit interval each non-inverted sample value is inverted as yet and each sample value inverted in the first bit interval is no longer inverted. In this manner the switching signals Q2 and Q3 are continued only after each second bit interval whereas the switching signals Q1 and Q4 are continued after each single bit interval.

If the number of sampling pulses per bit clock is chosen in such a way that the number of sampling pulses divided by four produces a remainder of unity, the quadrature components rotate from one bit clock to the next through 90°. The sample value of the normal component I becomes the quadrature component Q in the second bit clock, in the third bit clock the inverted normal component $-I$ and in the fourth bit clock the inverted quadrature component $-Q$. This holds in like manner for the quadrature component Q. If the number of basic clock pulses per bit clock is selected in such a way that it produces a remainder of three when divided by four, the quadrature components lag by 90° in phase from one bit clock to the next.

If in the transmitter a non-linear angle modulation such as, for example, a type of modulation known as Gaussian Minimum Shift Keying (GMSK) or a type of modulation known as Generalized Tamed Frequency Modulation (GTFM) is selected, the circuitry which is to be used for signal equalization in the digital signal processing section 3 can even be reduced. With such types of modulation the complicated structure of a non-linear angle modulation need no longer be taken into account but the equalization can be restricted to the case where a linear amplitude modulation was used during transmission. Consequently, for equalization and demodulation only real numerical values are to be processed in the digital signal processing section 3.

In the following an exemplary embodiment is briefly described for such a rotation of the quadrature components. On the basis of the same bit frequency $f_b = 270.833$ kHz the number of basic clock pulses per bit interval $T_a$ is selected to be 159. With this number there is a remainder of three when four is the divisor, so that the requirement as to the rotation is fulfilled. Thus, the second intermediate frequency ZF2 will be $159*(f_b/4) = 10.76562$ MHz; a frequency which is still near to 10.7 MHz. When retaining the distances between the sampling pulses $f_i$ the counter 201 produces the same switching signals Q1, Q2, Q3 and Q4 whereas after each 158th basic clock pulse an additional 159th basic clock pulse is inserted per bit interval, whilst all switching signals Q1, Q2, Q3 retain the same signal condition as in the previous basic clock pulse 158. Due to the rotation the switching signals in the succeeding bit intervals remain the same and are periodically repeated after each bit interval $T_a$.

If the quadrature components having the correct phase are still necessary for the signal processing, this rotation can be eliminated in an embodiment of the invention in which the number of basic clock pulses per bit interval divided by four produces an odd remainder, by mixing and/or inverting the components per bit clock. This can be performed, for example, by processing the quadrature components again in that they are applied to a switch (not shown) which interchanges the normal component and the quadrature component in each second bit interval $T_a$. The still necessary inversions can be performed by merely accordingly driving the change-over switches 233, 234.

In a further exemplary embodiment shown in FIG. 4, as in the first exemplary embodiment, the second intermediate frequency ZF2 is selected in such a way that a bit interval is equal to 158 basic clock pulses. The time-dependent position of the sampling pulses and switching signals for four succeeding bit intervals are shown. The sampling pulses $f_i$ and switching pulses of the first bit interval ($=$basic clock signals 0 to 15 in FIG. 4) correspond to the sampling pulses and switching signals during the first bit interval in the first exemplary embodiment. In this exemplary embodiment the periodic continuation of the sampling pulses and the associated switching signals is delayed in three succeeding bit intervals by one basic clock signal and in a succeeding fourth bit interval shortened by three basic clock signals. Consequently, the first sampling pulse of the second bit interval ($=$basic clock pulses 158 to 316 in FIG. 4) is not situated at the first basic clock pulse as in the preceding exemplary embodiments but at the second basic clock pulse of the second bit interval ($=$basic clock pulse 159 in FIG. 4b). From FIG. 4a it is evident that, compared to the first exemplary embodiment (cf. FIG. 2a), the sampling is effected a quarter period of the carrier frequency later. Consequently, the inverted quadrature component is obtained during the sampling with the first sampling pulse in the second bit interval. The second sample value in the second bit interval provides a sample value for the normal component. Similarly holds for the other sample values in the second bit interval.

In the third bit interval ($=$basic clock pulses 316 to 474 in FIG. 4b') again the sampling pulse sequence and the associated switching signals are continued delayed by a basic clock signal. The first sampling pulse of the third bit interval thus falls on the third basic clock pulse of the third bit interval ($=$basic clock pulse 318 in FIG. 4b'). In this case FIG. 4a' shows that the first sample value of the third sampling interval of the inverted normal component and the second sample value of the third sampling interval correspond to a sample value of the quadrature component. The periodic sequence of the sampling pulses is also continued in the fourth bit interval ($=$basic clock pulse 474 to 632) again delayed by a basic clock signal. The first sampling pulse of the fourth sampling interval thus corresponds to the basic clock pulse 477. The sample value obtained with the first sampling pulse in the fourth bit interval thus corresponds to the sample value of a quadrature component and the second sample value of the fourth bit interval corresponds to an inverted sample value of the quadrature component.

In the initial three bit intervals the period of the sampling pulses and the switching signals Q2, Q3 is one basic clock signal longer than the number of basic clock pulses per interval, thus in this exemplary embodiment is three times 159 basic clock pulses in succession. The distance in time between the first sample value of the fourth bit interval and the first sample value of the next bit interval in this exemplary embodiment, however, is shortened by three basic clock pulses and accordingly amounts to only 155 basic clock pulses. In this manner the first sample value of the fifth bit interval is situated at basic clock pulse 632. The distance between the first sampling pulse of the first bit interval and the first sampling pulse of the fifth bit interval in this manner corresponds to four bit intervals ($=632=$four times the 158 basic clock pulses). In this manner a sample value of the normal component will again be obtained by means of the first sampling pulse of the fifth bit interval. The variation of the sampling pulses and the signal variation of the fifth sampling interval henceforth corresponds to the first sampling interval.

The order of the described sequence of sampling pulses causes the sampling pulses in succeeding bit intervals $T_a$ to be shifted by a quarter of a period of the second intermediate frequency ZF2. Consequently, sample values of the I and Q components are alternately applied to either of the two branches. I and Q components are alternately interpolated. After each fourth bit interval there is a clock equalization as a result of a sequence of sampling pulses shortened by three basic clock pulses, so that the mean number of basic clock pulses per bit interval and the number of output values of the quadrature signal generator are equal compared to the first exemplary embodiment.

This exemplary embodiment is advantageous in that the variation of the switching signals Q1, Q2, Q3 remains the same in all four bit intervals. This simplifies the structure of the counter. The counter is reset three times in succession after 159 basic clock pulses and after these three longer basic clock pulses reset already after 155 basic clock pulses.

In this manner also with bit intervals in which the number of basic clock pulses are an integer, sample values rotating from one bit interval to the next can be obtained. With the necessary changes having been made this embodiment can also be implemented in arrangements in which the number of basic clock pulses per bit interval is an odd number and in which the consequent effect of rotation of the sample values is to be eliminated.

I claim:

1. A receiver for a modulated carrier signal having normal and quadrature signal components, said receiver comprising:
    means for obtaining sample values of said modulated carrier signal at successive sampling instants in successive spaced apart groups of sampling instants, each group containing a first integer number of sampling instants which are equally spaced apart by an input sampling time interval which is a second integer number times a basic clock period, and a group distance between a last sampling instant of a group and the first sampling instant of a next group being selected different than said input sampling time interval; and
    means for determining a value of said normal signal component and a value of said quadrature signal component from sample values of said modulated carrier signal obtained at sampling instants in a group.

2. Receiver as claimed in claim 1, characterised in that a variable group distance is selected.

3. Receiver as claimed in claim 1 wherein said basic clock period is a quarter of the period of the carrier signal and said second integer number is odd.

4. Receiver as claimed in claim 3 or 2, wherein the group distance is a third integer number times a quarter of the period of the carrier signal.

5. Receiver as claimed in claim 4, wherein a digital signal having a specific bit period between successive bits forms the basis of the modulated carrier signal, and wherein a time interval between a first sampling instant of a group and a first sampling instant of the next group is selected to be equal to, or an integral multiple of, the bit period of the digital signal.

6. Receiver as claimed in claim 5, wherein the sampling instants are determined by sampling pulses generated by a counter (202).

7. Receiver as claimed in claim 6, wherein said determining means comprises a component allocator which allocates the sample values obtained at the individual sampling instants to a first signal branch for determining the normal component signal value and to a second signal branch for determining the quadrature component signal value in response to a switching signal (Q1).

8. Receiver as claimed in claim 7, wherein said determining means further comprises at least one sign inverter to which sample values are applied and a changeover switch having a first input to which sample values are applied and a second input to which sample values inverter by the signal inverter are applied.

9. Receiver as claimed in claim 8, wherein at least one of the first and second signal branches comprises an interpolator.

10. Receiver as claimed in claim 8, wherein both said first and second signal branches comprise filter means for arithmetically combining sampling values.

11. Receiver as claimed in claim 1 or 2, further comprising an oscillator from which both said basic clock period and a mixing signal provided for receiving the modulated carrier signal are derived.

* * * * *